United States Patent
Hong et al.

(10) Patent No.: US 10,586,092 B2
(45) Date of Patent: Mar. 10, 2020

(54) APPARATUS AND METHOD FOR USER AUTHENTICATION, AND MOBILE DEVICE

(71) Applicant: Samsung Display Co., Ltd, Yongin-si, Gyeonggi-do (KR)

(72) Inventors: Won Ki Hong, Yongin-si (KR); Jong Seo Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 427 days.

(21) Appl. No.: 15/397,592

(22) Filed: Jan. 3, 2017

(65) Prior Publication Data

US 2017/0193277 A1    Jul. 6, 2017

(30) Foreign Application Priority Data

Jan. 6, 2016 (KR) .................. 10-2016-0001505

(51) Int. Cl.
*G06K 9/00* (2006.01)
*G06F 3/044* (2006.01)

(52) U.S. Cl.
CPC ......... *G06K 9/00087* (2013.01); *G06F 3/044* (2013.01); *G06K 9/00013* (2013.01); *G06K 9/00926* (2013.01)

(58) Field of Classification Search
CPC ............ G06F 3/044; G06K 9/00013; G06K 9/00087; G06K 9/00926
See application file for complete search history.

(56) References Cited

U.S. PATENT DOCUMENTS

| 7,800,592 | B2 | 9/2010 | Kerr et al. |
| 8,600,362 | B1 | 2/2013 | Kim |
| 8,601,876 | B2 | 12/2013 | Schneider et al. |
| 9,224,029 | B2 | 12/2015 | Setlak |
| 2005/0084138 | A1* | 4/2005 | Inkster ............... G06K 9/00362 382/115 |
| 2013/0296714 | A1* | 11/2013 | Kassim ............... A61B 5/6898 600/479 |
| 2014/0354597 | A1* | 12/2014 | Kitchens, II ......... G06F 1/3215 345/175 |
| 2015/0036065 | A1 | 2/2015 | Yousefpor et al. |
| 2015/0103023 | A1 | 4/2015 | Iwaki |
| 2019/0278973 | A1 | 9/2019 | Setlak et al. |

FOREIGN PATENT DOCUMENTS

| KR | 10-1070111 B1 | 10/2011 |
| KR | 10-2015-0014788 A | 2/2015 |
| KR | 10-2015-0022384 A | 3/2015 |
| KR | 10-2015-0042705 A | 4/2015 |

OTHER PUBLICATIONS

Michal Choras' and Rafal Kozik: "Contactless Palmprint and Knuckle Biometrics for Mobile Devices", Oct. 18, 2011; Pattern Anal. Applic.; 15, pp. 73-85. (Year: 2011).*

* cited by examiner

*Primary Examiner* — Siamak Harandi

(74) *Attorney, Agent, or Firm* — Innovation Counsel LLP

(57) ABSTRACT

An apparatus for user authentication includes a sensor array and a sensing signal processor. The sensor array is formed on at least one surface of a mobile device. The sensing signal processor receives information of a palm of a user, received from the sensor array, and performs a user authentication through pattern analysis. Accordingly, an authentication of the user of the mobile device can be simply performed.

8 Claims, 12 Drawing Sheets

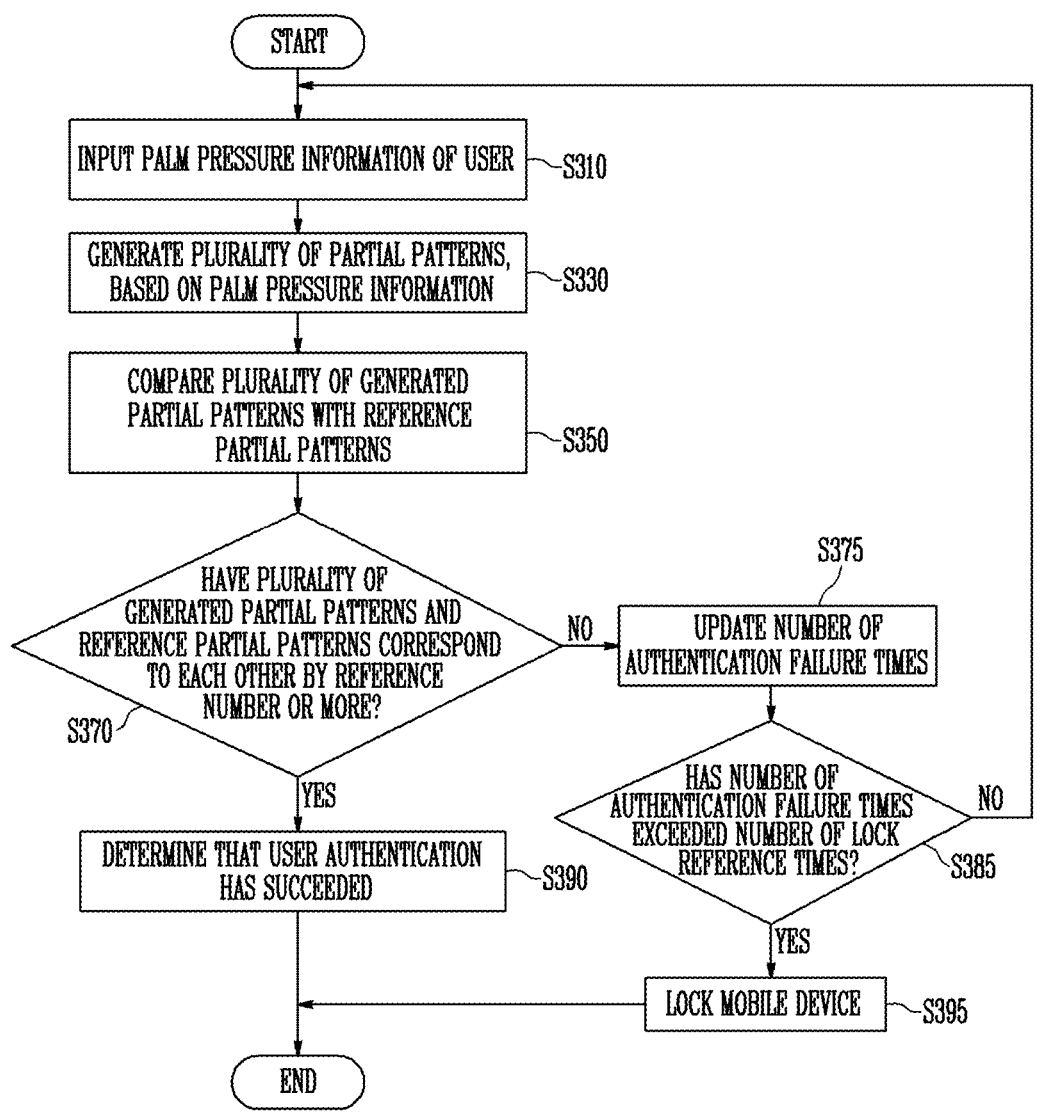

APPARATUS AND METHOD FOR USER AUTHENTICATION, AND MOBILE DEVICE

RELATED APPLICATIONS

The present application claims priority to Korean Patent Application No. 10-2016-0001505, filed on Jan. 6, 2016, in the Korean Intellectual Property Office, the entire disclosure of which is incorporated by reference herein.

BACKGROUND

1. Field

An aspect of the present disclosure relates to an apparatus and a method for user authentication, and a mobile device, and more particularly, to an apparatus and a method for user authentication, and a mobile device, which use a user's palm information.

2. Description of the Related Art

A mobile device such as a smart phone, a tablet device, or a notebook computer is an electronic device that a user can use and easily transport it on the user's person. The mobility of such a mobile device allows the mobile device to be conveniently used. On the other hand, when an accident such as loss of the mobile device occurs, a third party may illegitimately access and use the mobile device. Particularly, since the mobile device frequently stores sensitive information such as personal information, interest in user authentication of the mobile device has increased.

In general, when there is no user input for a certain time, a mobile device is set to a lock mode, and a user's authentication is required to change the mode of the mobile device from the lock mode to a use mode. Conventionally, to perform such a user's authentication, there is a method of inputting a password using a keypad, a method of inputting an authentication pattern on a touch screen, a method using a fingerprint sensor provided in a mobile device, a method recognizing a user's face using an image pickup device provided in a mobile device, and the like.

However, in the case of a method for performing an authentication by inputting a password using a keypad or inputting an authentication pattern, the password or the authentication pattern may be illegitimately acquired by a third party. In the case of a biological authentication through a fingerprint recognition or face recognition, it is possible to prevent a third party from performing an authentication. However, in the case of a fingerprint recognition, a fingerprint sensor having a high resolution is separately required. In the case of a face recognition, the error rate of the face recognition is high. In fingerprint recognition, a fingerprint sensor having a high resolution of, for example, 500 ppi or more is required. In addition, it is difficult to perform wiring due to the high-resolution fingerprint sensor.

Meanwhile, in the case of a biological authentication through a fingerprint recognition or face recognition, a user should perform a separate authentication procedure, and therefore, inconvenience exists in terms of UI.

SUMMARY

Embodiments provide an apparatus for user authentication, which can simply perform a user authentication operation of a mobile device.

Embodiments provide a method for user authentication, which can simply perform a user authentication operation of a mobile device.

Embodiments provide a mobile device which can simply perform a user authentication operation.

According to an aspect of the present disclosure, there is provided an apparatus for user authentication, the apparatus including: a sensor array formed on at least one surface of a mobile device; and a sensing signal processor configured to receive information of a palm of a user and perform a user authentication through pattern analysis, wherein the information of the palm of the user received from the sensor array.

The sensor array may be formed on a display panel of the mobile device.

The sensor array may be implemented as a capacitive touch sensor.

The sensor array may include a plurality of unit sensors. Each of the unit sensor may include at least one of a piezoelectric semiconductor, a piezoelectric carbon powder, a metal compound, a metal nano-particle, a silicone, a biometics structure electrode, a CNT, a graphene, a metal nanowire, and an elective active polymer (EAP).

The sensor array may include a plurality of unit sensors. The sensor array may be formed integrally with the display panel of the mobile device. Each unit sensor of the plurality of unit sensors may be implemented in an in-cell type.

The sensor array may include a plurality of unit sensors. The sensor array may be formed separately from the display panel of the mobile device. Each unit sensor of the plurality of unit sensors may be implemented in an on-cell type on an encapsulation substrate of the display panel.

The sensor array may include a plurality of unit sensors. Each unit sensor of the plurality of unit sensors may be disposed with adjacent unit sensors to form a distance of 2 to 4 mm.

The sensor array may sense positions contacted with the palm and contact pressures at the positions.

The sensing signal processor generates an image of the palm, based on the information of the palm of the user, received from the sensor array, generates at least one partial pattern by analyzing the image of the palm, and performs an authentication operation of the user by comparing the generated at least one partial pattern with at least one reference partial pattern previously stored in the apparatus.

The display panel may be formed on a first surface of the mobile device. The sensor array may be formed on a second surface opposite to the first surface of the mobile device.

The sensor array may include a Wheatstone bridge circuit or a voltage dividing circuit.

According to an aspect of the present disclosure, there is provided a method for user authentication, the method including: initially inputting, by a sensor array of a mobile device, information of a palm of a user; generating a plurality of partial patterns, based on the information of the palm, and registering the plurality of partial patterns as reference partial patterns of the user; and setting an authentication accuracy to be applied in an authentication and a reference number of partial patterns to be compared.

The sensor array may generate the information of the palm of the user by sensing positions contacted with the palm and contact pressures at the positions.

The partial pattern may include at least one of information on a length of each finger, information on a thickness of each finger, information on a joint width of each finger, and information on unevennesses of the palm.

According to an aspect of the present disclosure, there is provided a method for user authentication, the method including: inputting, by a sensor array of a mobile device, palm pressure information of a user; generating a plurality of partial patterns, based on the input palm pressure information; comparing at least one of the plurality of generated partial patterns with at least one of a plurality of previously stored reference partial patterns; and generating a user authentication result based on the comparison result.

In the comparing of the at least one of the plurality of generated partial patterns with the at least one of the plurality of previously stored reference partial patterns, the at least one partial pattern may be compared with the at least one reference partial pattern, based on a previously stored authentication accuracy.

The generating of the user authentication result based on the comparison result may include: counting a number of partial patterns among the plurality of partial patterns, which are determined to correspond to the plurality of previously stored reference partial patterns; and generating the user authentication result by comparing the number of partial patterns determined to correspond to the reference partial patterns with a previously stored reference number.

In the generating of the user authentication result by comparing the number of partial patterns determined to correspond to the reference partial patterns with the previously stored reference number, the user authentication result may be set as an authentication success when the number of partial patterns determined to correspond to the reference partial patterns is equal to or greater than the reference number, and the user authentication result may be set as an authentication failure when the number of partial patterns determined to correspond to the reference partial patterns is less than the reference number.

The plurality of previously stored reference partial patterns may be generated based on palm pressure information of two or more different users. In the generating of the user authentication result based on the comparison result, information of an authenticated user may be generated when the user authentication result is determined as the authentication success.

According to an aspect of the present disclosure, there is provided a mobile device including: a display device configured to display an image on the display panel based on image data; a sensor array formed on the display panel of the display device; and a sensing signal processor configured to receive information of a palm of a user, received from the sensor array, and perform a user authentication through pattern analysis, wherein the sensor array senses positions contacted with the palm and contact pressures at the positions, wherein the sensing signal processor generates at least one partial pattern, based on the received information of the palm, and performs a user authentication by comparing the at least one partial pattern with at least one previously stored reference partial pattern.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 13 is a flowchart illustrating a third embodiment of the method for user authentication according to the present disclosure.

DETAILED DESCRIPTION

Figure 1:
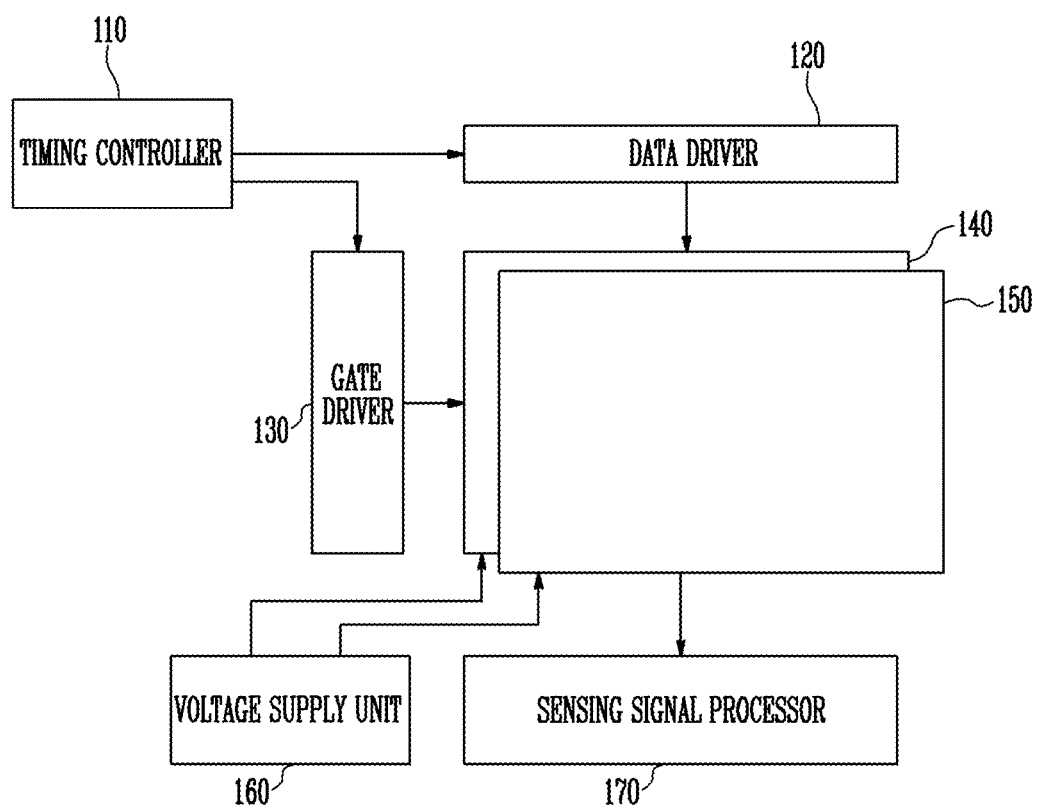
FIG. 1 is a block diagram illustrating a mobile device according to an embodiment of the present disclosure.

Hereinafter, exemplary embodiments of the present disclosure will be described in detail with reference to the accompanying drawings. The same reference numerals are used to designate the same elements as those shown in other drawings. In the following descriptions, only portions necessary for understanding operations according to the exemplary embodiments may be described, and descriptions of the other portions may be omitted so as to not obscure important concepts of the embodiments. Therefore, the present disclosure is not limited to the following embodiments but may be implemented in other forms. However, the following embodiments are provided such that those skilled in the art can easily embody the technical concept of the present disclosure.

FIG. 1 is a block diagram illustrating a mobile device according to an embodiment of the present disclosure.

Referring to FIG. 1, the mobile device according to the embodiment of the present disclosure includes a display device, a sensor array 150, and a sensing signal processor 170. The display device includes a timing controller 110, a data driver 120, a gate driver 130, and a display panel 140. The mobile device may further include a voltage supply unit 160 that provides a power voltage to the display panel 140 and the sensor array 150. The timing controller 110 may control operations of the data driver 120 and the gate driver 130, and provide image data to the data driver 120. The data driver 120 and the gate driver 130 may control an operation of the display panel 140, thereby displaying the image data provided from the timing controller 110 on the display panel 140.

In the embodiment of the present disclosure, the sensor array 150 may be formed on a top surface of the display panel 140. In an embodiment, the sensor array 150 may be a capacitive touch sensor.

In another embodiment, the sensor array 150 may be configured to include a plurality of unit sensors. In this case, the plurality of unit sensors included in the sensor array 150 may be configured to include at least one of a piezoelectric semiconductor, a piezoelectric carbon powder, a metal compound, a metal nano-particle, a silicone, a biometics structure electrode, a CNT, a graphene, a metal nanowire, and an elective active polymer (EAP).

The piezoelectric semiconductor may be formed of $MoS_2$ or ZnO. Particularly, a two-dimensional transition metal dichalcogenide (TMDC) is a substance group with chemical formula MX2. Here, M is a Group IV, V, or VI transition metal (Mo, W, etc.), and X includes chalocogenide elements (S, Se, and Te). Representative examples of the TMDC are $MoS_2$, $WS_2$, $MoSe_2$, $WSe_2$, and the like. The TMDC has a piezoelectric property in two-dimensional crystals due to inversion symmetry. When the TMDC is formed in even-numbered layers, the TMDC has no piezoelectric effect due to an offset effect caused by coupling. However, when the TMDC is formed in odd-numbered layers, a piezoelectric effect appears. The TMDC may be formed in a single layer having a thickness of 1 nm or less. The TMDC may be applied to flexible displays or wearable devices using a high-performance flexible element having transparency. The TMDC may be formed through chemical vapor deposition (CVD).

The ZnO is a representative semiconductor that generates a piezoelectric effect, and AlN, GaN, InN, CdS, CdSe, and ZnS also have characteristics of the piezoelectric semiconductor. Schottky barrier energy formed between a metal and a semiconductor is effectively changed to control a charge transfer process. The ZnO may enhance piezoelectric characteristics through doping, surface treatment, crystallinity control, etc. Since the ZnO is transparent in a visible region due to a wide bandgap of 3.2 eV, the ZnO may be formed on the top surface of the display panel. The ZnO may be formed through sputtering deposition and etching.

Meanwhile, when the sensor array 150 is implemented as the capacitive touch sensor, it is required to receive a driving voltage applied from the voltage supply unit 160 as shown in FIG. 1. However, when the sensor array 150 is formed of the piezoelectric semiconductor, etc., it is not required to receive the driving voltage applied from the voltage supply unit 160.

The mobile device according to the embodiment of the present disclosure includes not only the display device that displays an image based on image data but also the sensor array 150 and the sensing signal processor 170, which are formed on the display panel 140 of the display device, so that a user authentication operation can be performed. The sensor array 150 receives information on a palm of a user to be authenticated. In this case, the sensor array 150 senses positions at which contacts with points of the palm occur, and may also sense contact pressures at the corresponding positions. The positions at which the contacts occur and the contact pressures at the corresponding positions are transmitted as the information on the palm to the sensing signal processor 170.

The sensing signal processor 170 may analyze the received information on the palm and perform a user authentication through pattern analysis. Specifically, the sensing signal processor 170 may generate an image of the palm through the positions at which the contacts occurs and the pressures at the corresponding positions, which are included in the information on the palm. The sensing signal processor 170 may generate partial patterns of the palm, based on the generated image of the palm. The user authentication may be performed in such a manner that, when a certain number or more of partial patterns correspond when comparing the generated partial patterns with previously stored reference partial patterns, the user is determined as legal user. The image of the palm, which is generated through the information of the palm, will be described later with reference to FIGS. 5 to 7. The process of generating the partial patterns of the palm will be described later with reference to FIG. 8.

Thus, the mobile device according to an embodiment of the present disclosure performs a user authentication through partial patterns of a palm having a relatively large size, and thus the user authentication can be performed without any high-resolution sensor required for fingerprint recognition. Particularly, while the existing fingerprint recognition device requires a resolution of 500 ppi or more, the mobile device can perform a user authentication with a resolution of 6 to 8 ppi or so, which is relatively low. Thus, a user authentication can be performed through the sensor array 150 having low resolution, and a user authentication can be performed using the existing touch sensor panel as the sensor array 150. Accordingly, it is possible to reduce the manufacturing cost and time of a mobile device having a user authentication function.

Meanwhile, only some components of the mobile device according to the embodiment of the present disclosure are illustrated in FIG. 1. That is, only the display device and an apparatus for user authentication, which are included in the mobile device, are illustrated in FIG. 1, but the mobile device may further include various components. For example, the mobile device may further include a central processing unit such as an application processor or a microprocessor, a memory device including a RAM, a ROM, a flash memory, and the like, a bus that functions to transmit/receive information between components, a network interface device that functions to perform communication with the outside of the mobile device, and the like.

Figure 2:
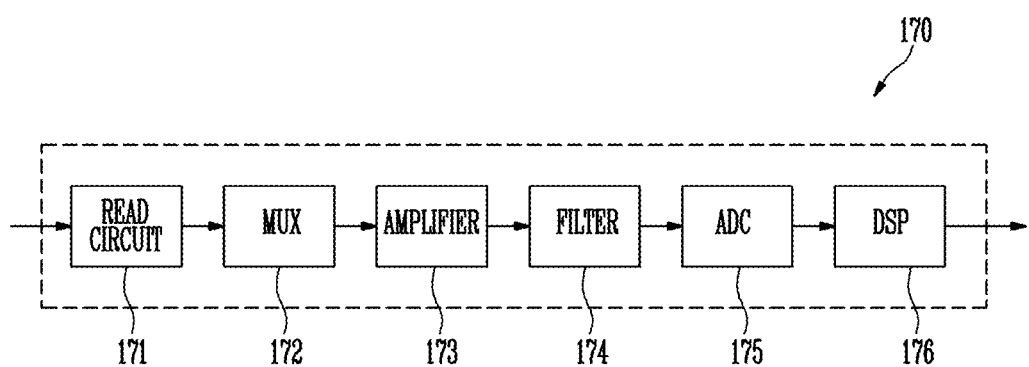
FIG. 2 is a block diagram illustrating an example of a sensing signal processor shown in FIG. 1.

FIG. 2 is a block diagram illustrating an example of the sensing signal processor shown in FIG. 1.

Referring to FIG. 2, the sensing signal processor may include a read circuit 171, a multiplexer 172, an amplifier 173, a filter 174, an ADC 175, and a digital signal processor (DSP) 176. The read circuit 171 reads out a signal received from the sensor array. The multiplexer 172 multiplexes the signal read through the read circuit 171. The amplifier 173 amplifies the signal multiplexed by the multiplexer 172. The filter 174 filters and removes noise of the signal amplified by the amplifier 173. The ADC 175 converts the signal from which the noise is removed into a digital signal. The DSP 176 generates a sensing image by processing the converted digital signal, generates partial patterns of a palm by analyzing the generated sensing image, and performs a user authentication in such a manner that it is determined whether a user is a legal user by comparing the generated partial patterns with previously stored reference partial patterns.

Figure 3:
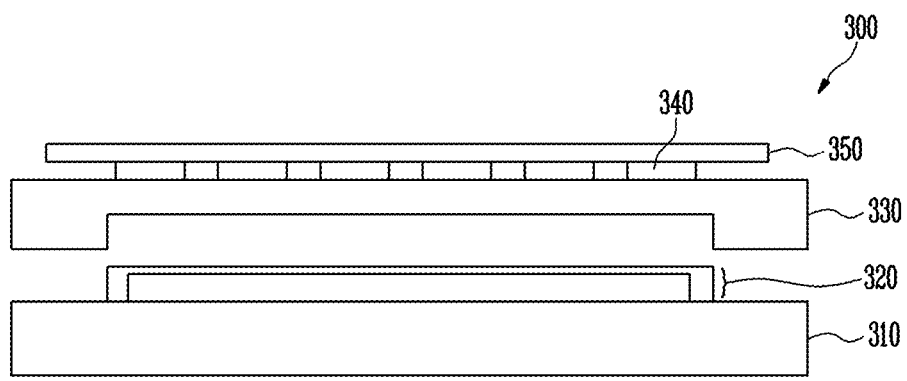
FIG. 3 is a side sectional view illustrating an on-cell type pressure sensor structure.

FIG. 3 is a side sectional view illustrating an on-cell type pressure sensor structure.

Referring to FIG. 3, the on-cell type pressure sensor structure 300 formed on a display panel is illustrated. The display panel includes a substrate 310, a light emitting element layer 320 formed on the substrate 310, and a first encapsulation layer 330 formed on the light emitting element layer 320. Meanwhile, a sensor array includes a piezoelectric thin film 340 formed on the first encapsulation layer 330 and a second encapsulation layer 350 formed on the piezoelectric thin film 340. In an embodiment, the light emitting element layer 320 may include an organic light emitting diode. In another embodiment, the light emitting element layer 320 may include a backlight layer and a liquid crystal layer. Therefore, various types of light emitting means may be used as the light emitting element layer 320.

As described above, the piezoelectric semiconductor formed of $MoS_2$ or $ZnO$ has transparent characteristics. Hence, as shown in FIG. 3, the piezoelectric semiconductor may be formed in an on-cell type to constitute the sensor array.

Meanwhile, although the on-cell type pressure sensor structure is illustrated in FIG. 3, an in-cell type pressure sensor structure may also be employed in the present disclosure. In this case, a plurality of unit sensors may be formed in an array form in the display panel.

In FIGS. 1 and 3, the embodiment in which the sensor array is formed on the top surface of the display panel or formed integrally with the display panel is mainly illustrated. However, in some embodiments, the sensor array may be formed on a surface of the mobile device, on which the display panel is not formed. For example, the display panel may be formed on a first surface of the mobile device, and the sensor array may be formed on a second surface opposite to the first surface. That is, the sensor array may be formed on not only a surface on which the display panel is formed but also a side surface or rear surface of the surface on which the display panel is formed.

Figure 4A:
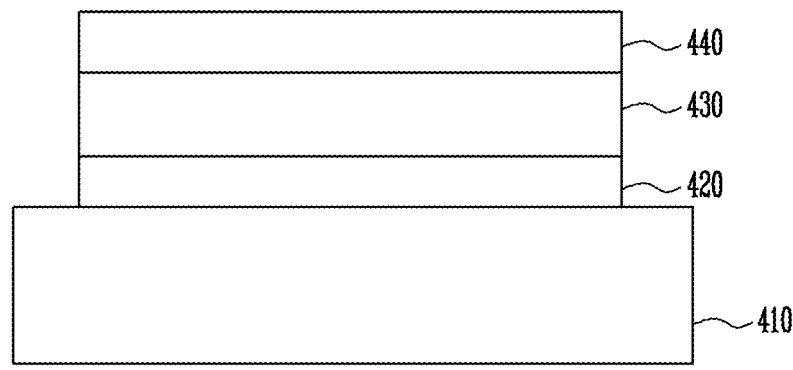
FIG. 4A is a side sectional view illustrating an exemplary first electrode structure of a pressure sensor.

FIG. 4A is a side sectional view illustrating an exemplary first electrode structure of a pressure sensor.

Referring to FIG. 4A, the exemplary first electrode structure of the pressure sensor includes a substrate 410, a first electrode 420 formed on the substrate 410, a piezoelectric layer 430 formed on the first electrode 420, and a second electrode 440 formed on the piezoelectric layer 430. That is, according to the first electrode structure shown in FIG. 4A, the first electrode 420, the piezoelectric layer 430, and the second electrode 440 are sequentially stacked.

Figure 4B:
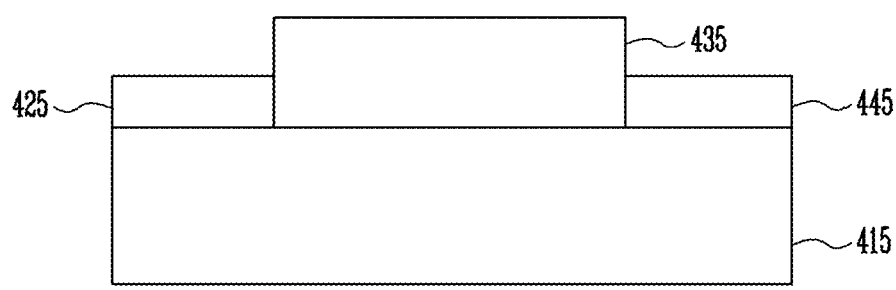
FIG. 4B is a side sectional view illustrating an exemplary second electrode structure of the pressure sensor.

FIG. 4B is a side sectional view illustrating an exemplary second electrode structure of the pressure sensor.

Referring to FIG. 4B, the exemplary second electrode structure of the pressure sensor includes a substrate 415, and a first electrode 425, a piezoelectric layer 435, and a second electrode 445, which are formed on the substrate 415. That is, according to the second electrode structure shown in FIG. 4B, the first electrode 425, the piezoelectric layer 435, and the second electrode 445 may all be formed on the substrate 415.

Figure 5:
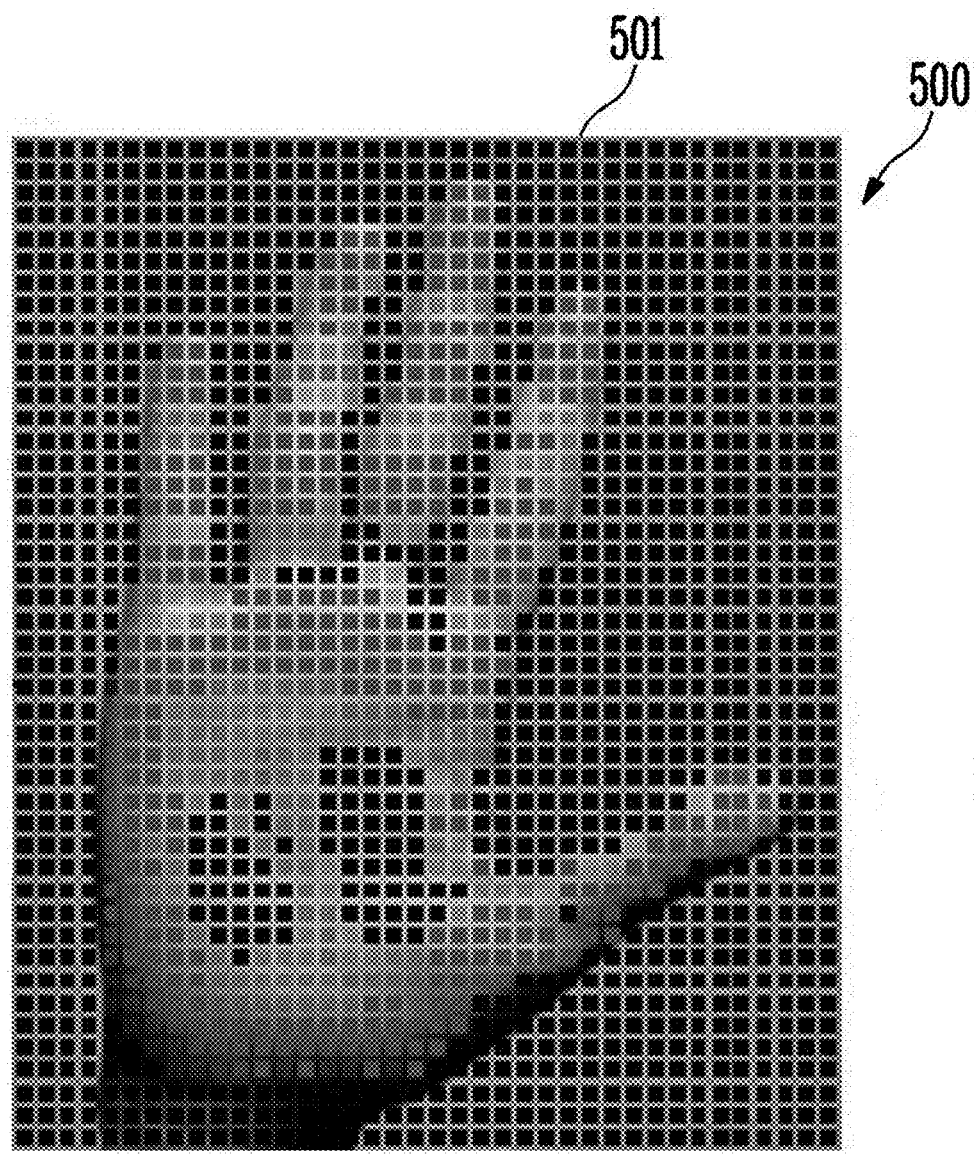
FIG. 5 is a view schematically illustrating palm information received through a sensor array.

FIG. 5 is a view schematically illustrating palm information received through a sensor array.

Referring to FIG. 5, sensing of palm information when a user places a palm to contact the sensor array 500 is schematically illustrated. The sensor array 500 may include a plurality of unit sensors 501. The unit sensors 501 may be arranged in a matrix form to constitute the sensor array 500. As schematically shown in FIG. 5, each of the unit sensors 501 may sense the strength of pressure in a plurality of steps. In FIG. 5, unit sensors not contacted with the palm is displayed with a black color, and unit sensors contacted with the palm are displayed with different colors based on strengths of the contact. That is, as the pressure of the contacted unit sensor becomes higher, the contacted unit sensor is displayed with a brighter color. As the pressure of the contacted unit sensor becomes lower, the contacted unit sensor is displayed with a darker color. Thus, the sensor array can generate contact information having a higher quality than touch sensor arrays that simply sense only the occurrence of contact. Furthermore, as the step of pressure that each unit sensor can sense becomes segmentalized, contact information and contact images having higher quality can be generated through interpolation processing, etc.

Each of the unit sensors shown in FIG. 5 may be disposed with adjacent unit sensors to form a distance of 2 to 4 mm. In this case, the resolution of the sensor array is relatively low. However, since the apparatus for user authentication according to the present disclosure measures a large pattern such as a palm, a user authentication having a relatively high accuracy can be performed even through the sensor array having a low resolution.

Figure 6:
FIG. 6 is an image visually illustrating the received palm information.

FIG. 6 is an image visually illustrating the received palm information.

A sensing image may be generated as shown in FIG. 6, based on a signal generated through the sensing of the palm information described with reference to FIG. 5. Referring to FIG. 6, a portion having a high sensing pressure is displayed with a dark color, and a portion having a low sensing pressure is displayed with a bright color. As shown in FIG. 6, the palm of the user is sensed through the sensor array, so that it is possible to generate an image representing information of the palm and to generate partial patterns based on the generated image of the palm.

Figure 7:
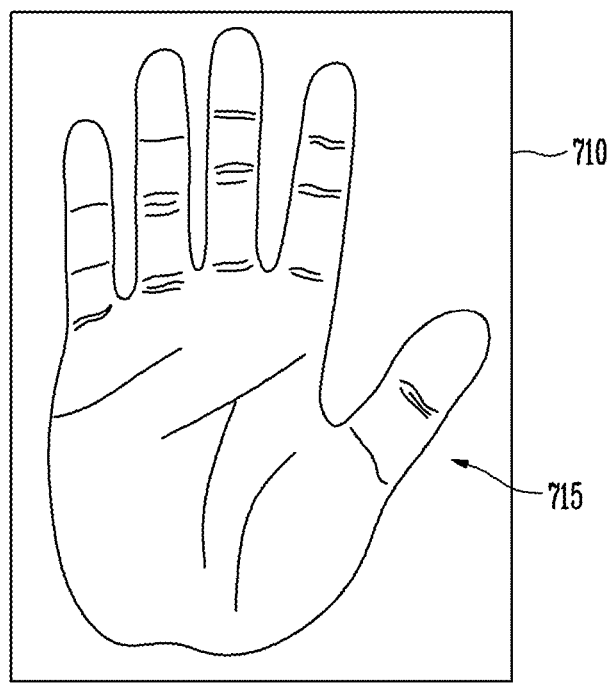
FIG. 7 is a view briefly illustrating the image shown in FIG. 6.

FIG. 7 is a view briefly illustrating the image shown in FIG. 6.

Referring to FIG. 7, a palm image 715 in the image area 710 is briefly illustrated. Partial patterns of the user's palm, which are to be compared, are generated from the palm image 715 shown in FIG. 7. The generation of the partial patterns of the user's palm will be described later with reference to FIG. 8.

Figure 8:
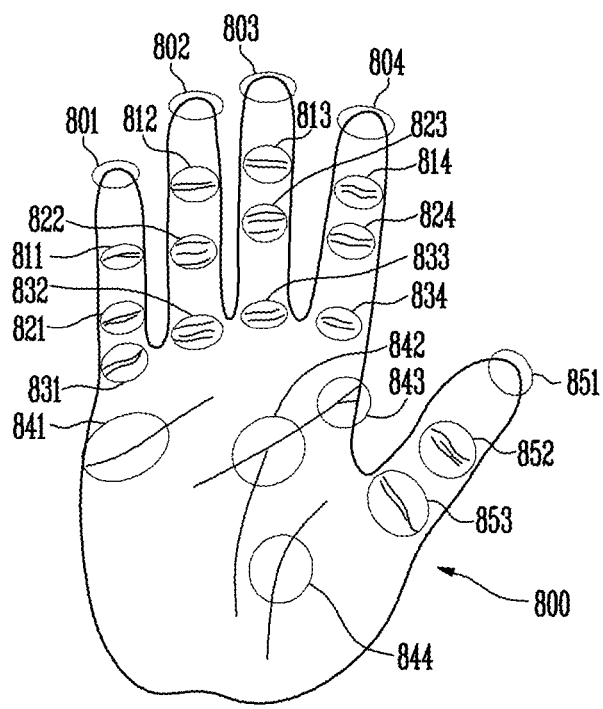
FIG. 8 is a view illustrating examples of partial patterns generated from palm information according to an embodiment of the present disclosure.

FIG. 8 is a view illustrating examples of partial patterns generated from palm information according to an embodiment of the present disclosure.

Referring to FIG. 8, a plurality of partial patterns may be generated from an image 800 of a user's palm. The partial patterns may include patterns 801, 802, 803, 804, and 851 of end portions of the fingers, patterns 811, 812, 813, 814, and 852 of first joints of the fingers, patterns 821, 822, 823, 824, and 853 of second joints of the fingers, patterns 831, 832, 833 and 834 of third joints of the fingers, uneven patterns 841, 842, 843, and 844 of the palm, and the like. The positions and number of the partial patterns is not fixed, and partial patterns representing various portions may be determined based on characteristics of the user's palm.

The lengths of the other fingers except the thumb may be determined based on the positions of the patterns 801, 802, 803, and 804 of the end portions of the fingers and the patterns 831, 832, 833, and 834 of the third joints of the fingers among the above-described patterns. In the case of the thumb, the length of the thumb may be determined based on the positions of the pattern 851 of the end portion of the thumb and the pattern 853 of the second joint of the thumb.

The apparatus for user authentication according to an embodiment of the present disclosure may perform a user authentication by comparing the above-described partial patterns with previously stored reference partial patterns. The reference partial patterns may be patterns generated by inputting information on a palm of a legal user through the sensor array in an initial operation of the mobile device. That is, in the initial operation of the mobile device, the shape of the user's palm may be initially input, and a plurality of partial patterns may be generated based on the input shape of the palm, thereby storing the plurality of partial patterns in the mobile device or the apparatus for user authentication. The stored partial patterns are registered as reference partial patterns. After that, partial patterns are generated by inputting the shape of the user's palm in a lock mode of the mobile device, and the generated partial patterns are compared with the previously stored reference partial patterns, thereby performing a user authentication operation.

In FIGS. 5 to 8, a case where the size of the sensor array is large enough to receive the entire palm of the user is illustrated. For example, in the case of a tablet device, the size of the tablet device is relatively large, and therefore, a large sensor array may be used as shown in FIGS. 5 to 8. However, in the case of a relatively small mobile device such as a smart phone, the size of a sensor array may not be large enough to receive the entire palm of the user. In this case, a user authentication may be performed by generating partial patterns in a portion of the user's palm, which input to the sensor array when the user grasps the mobile device. In this case, partial patterns having a smaller number than the partial patterns described through FIGS. 5 to 8 may be generated to perform the user authentication. For example, partial patterns of third joints of the user's fingers and uneven patterns of the user's palm may be generated as the partial patterns to be used for the user authentication.

Figure 9:
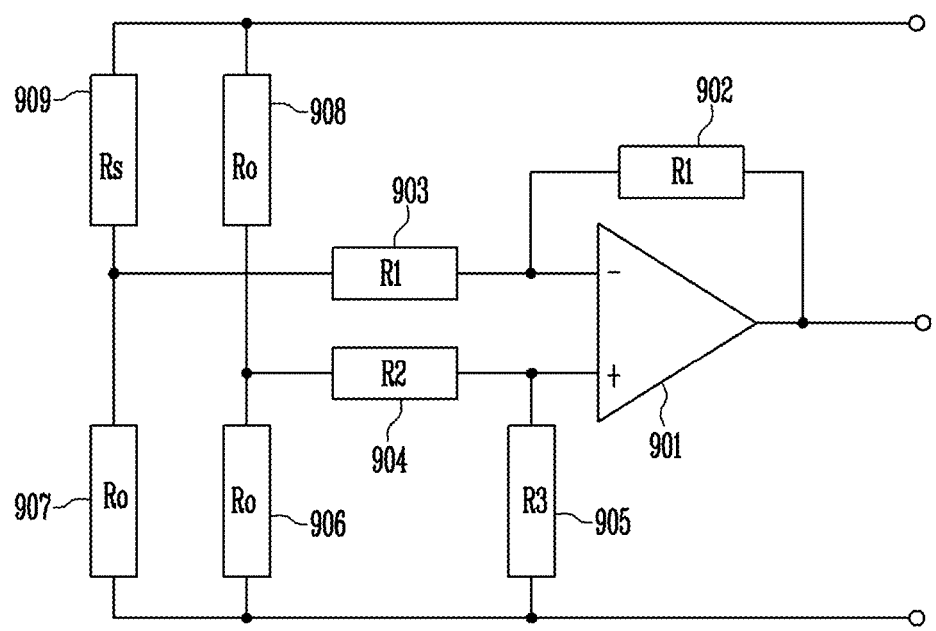
FIG. 9 is a circuit diagram illustrating a Wheatstone bridge circuit included in a sensor array according to an exemplary embodiment of the present disclosure.

FIG. 9 is a circuit diagram illustrating a Wheatstone bridge circuit included in a sensor array according to an exemplary embodiment of the present disclosure.

Referring to FIG. 9, the Wheatstone bridge circuit 900 includes an OP-AMP 901, a feedback resistor 902, first to third resistors 903, 904, and 905, three reference resistors 906, 907, and 908, and a comparison resistor 909. The comparison resistor 909 is a variable resistor, and is a pressure resistor of which resistance is changed depending on pressure. In the Wheatstone bridge circuit 900 shown in FIG. 9, when no pressure is applied, the resistance Rs of the comparison resistor 909 may be equal to resistances R0 of the reference resistors 906, 907, and 908. When the resistance Rs is changed as pressure is input to the comparison resistor 909, the output voltage of the Wheatstone bridge circuit 900 may be changed, and the size of the pressure applied to the comparison resistor 909 may be sensed based on the degree of change in the output voltage.

Figure 10:
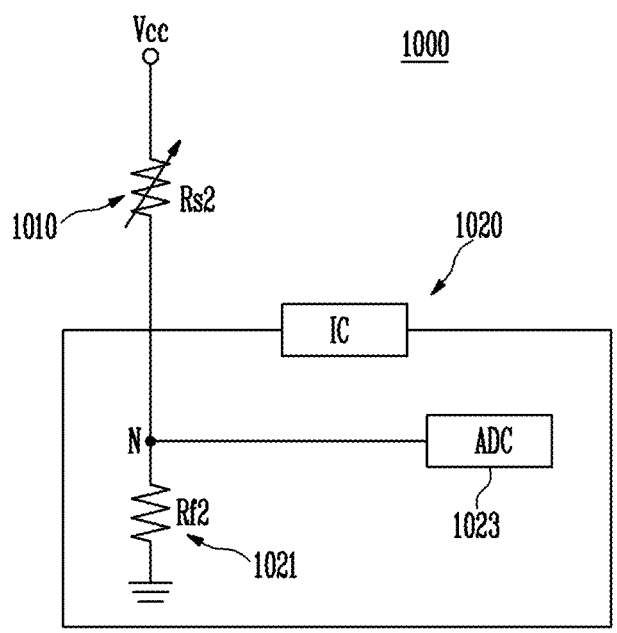
FIG. 10 is a circuit diagram illustrating a voltage dividing circuit included in the sensor array according to the exemplary embodiment of the present disclosure.

FIG. 10 is a circuit diagram illustrating a voltage dividing circuit included in the sensor array according to the exemplary embodiment of the present disclosure.

Referring to FIG. 10, the voltage dividing circuit 1000 may include a comparison resistor 1010, a reference resistor 1021, and an ADC 1023. The comparison resistor 1010 is connected between a driving voltage Vcc and a node N. The reference resistor 1021 is connected between the node N and a ground. The ADC 1023 is connected to the node N. The reference resistor 1021 and the ADC 1023 may be configured as an IC 1020.

A voltage applied to the ADC 1023 by voltage division is determined based on resistances of the comparison resistor 1010 and the reference resistor 1021. The comparison resistor 1010 is a pressure resistor of which resistance is changed depending on pressure. Thus, the degree of change in voltage measured at the node N is determined based on the degree of change in resistance Rs2 of the comparison resistor 1010. Accordingly, the ADC 1023 can measure the magnitude of pressure applied to the comparison resistor 1010, based on the degree of change in voltage.

The Wheatstone bridge circuit or voltage dividing circuit shown in FIG. 9 or 10 is a unit sensor, and may be provided in plurality in the sensor array.

Figure 11:
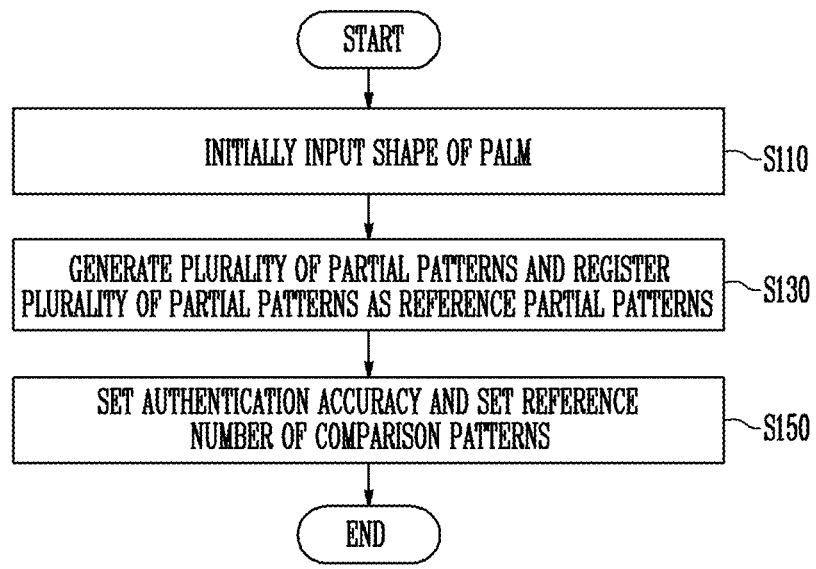
FIG. 11 is a flowchart illustrating a first embodiment of a method for user authentication according to the present disclosure.

FIG. 11 is a flowchart illustrating a first embodiment of a method for user authentication according to the present disclosure. In the method shown in FIG. 11, there is illustrated a process of registering patterns of a palm of a legal user in a mobile device and setting an authentication accuracy and a reference number of comparison patterns, which become a reference of comparison when a user authentication is performed to release an actual lock mode. That is, the method shown in FIG. 11 may be performed in an initial setting of the mobile device.

Referring to FIG. 11, the method according to the exemplary embodiment includes a step (S110) of initially inputting the shape of a palm of a user, a step (S130) of generating a plurality of partial patterns based on the input shape of the palm and registering the plurality of partial patterns as reference partial patterns, and a step (S150) of setting an authentication accuracy and setting a reference number of comparison patterns.

In step S110, the shape of a user's palm is initially input to a mobile device. Here, the initially input shape of the palm is one of a legal user of the mobile device. That is, in step S110, the shape of the user's palm for reference partial patterns to be compared to when a lock mode is released may be input by a sensor array of the mobile device. In step S110, the shape of the user's palm as shown in FIGS. 5 to 7 is input by the sensor array.

In step S130, a plurality of partial patterns may be generated based on the input shape of the palm. As shown in FIG. 8, a plurality of partial patterns are generated based on the shape of the palm, which is input in step S110. The generated partial patterns may be stored and registered as reference partial patterns in a storage device included in the mobile device. The reference partial patterns stored and registered in the storage device may be used to be compared with partial patterns input in a user authentication for releasing the actual lock mode.

In step S150, an authentication accuracy is set. Also, in step S150, a reference number of comparison patterns to be compared in a user authentication is set. The authentication accuracy may mean accuracy where, when individual partial patterns are compared, they are determined as patterns corresponding to each other. For example, if the authentication accuracy is set to 80%, when the shapes of two individual partial patterns are similar to a degree of 80% or more, the two partial patterns are determined as patterns corresponding to each other. Thus, when the authentication accuracy is set to a relatively high value, it is highly likely that, when a third party attempts to perform a user authentication, the user authentication will fail. That is, it is possible to reduce the possibility that the user authentication performed by the illegal third party will succeed. However, even in the case of a legal user, it is highly likely that, when the legal user performs a user authentication, it will be determined that the shapes of individual partial patterns do not correspond to each other. Therefore, the authentication accuracy may be determined as an experimentally appropriate value.

The reference number of comparison patterns may mean a number of identical partial patterns required to determine whether a user authentication succeeds. For example, the number of the partial patterns shown in FIG. 8 is 23. When the reference number of comparison patterns is set to 23, a user is authenticated as a legal user only when 23 partial patterns generated from a user's palm all correspond to previously stored reference partial patterns. As another example, when the reference number of comparison patterns is set to 15, the user is authenticated as a legal user only when 15 or more partial patterns among the generated 23 partial patterns correspond to the previously stored reference partial patterns. When the reference number of comparison patterns is set to a large number, the possibility that the user authentication of an illegal third party will succeed is decreased, but the possibility that the user authentication of a legal user will fail is also increased. When the reference number of comparison patterns is set to a small value, the possibility that the user authentication of an illegal third party will succeed is increased, but the possibility that the user authentication of a legal user will succeed is also increased. Therefore, the reference number of comparison patterns is required to be set to an appropriate value.

Figure 12:
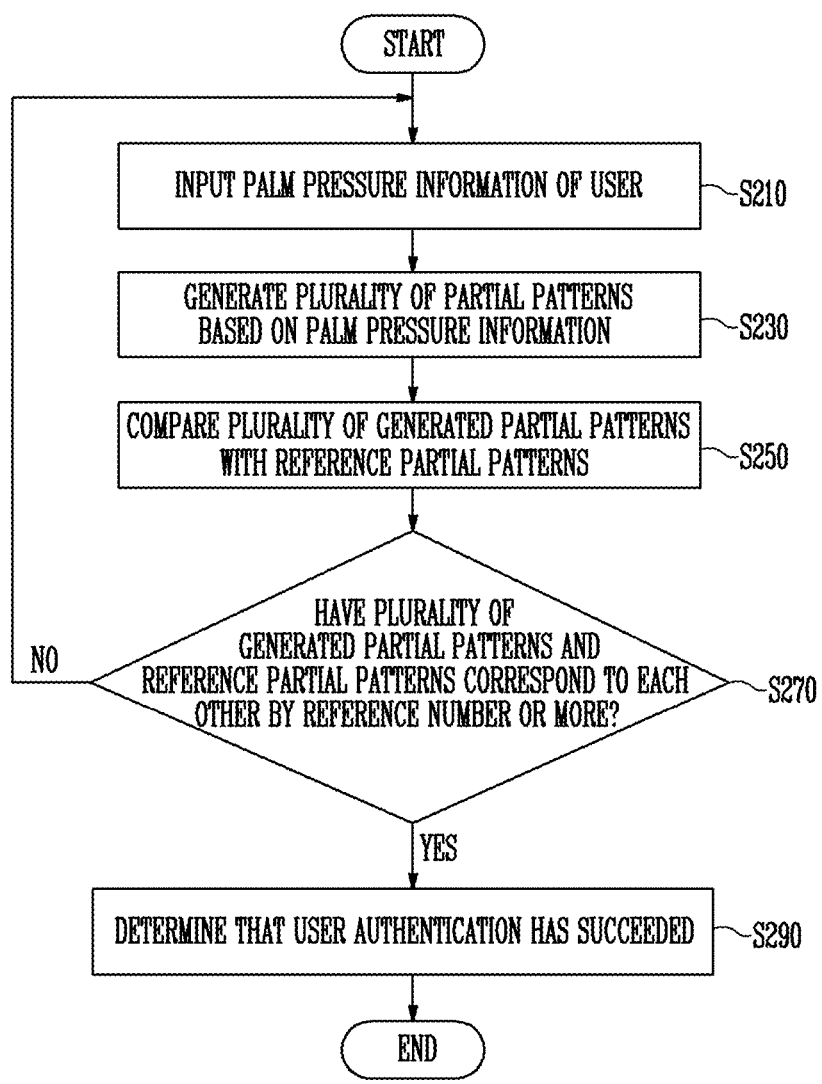
FIG. 12 is a flowchart illustrating a second embodiment of the method for user authentication according to the present disclosure.

FIG. 12 is a flowchart illustrating a second embodiment of the method for user authentication according to the present disclosure. In FIG. 12, there is illustrated a process of releasing the lock mode by inputting the shape of a palm of a user when the mobile device is in the lock mode.

Referring to FIG. 12, the method according to the embodiment of the present disclosure includes a step (S210) of inputting palm pressure information of a user, a step (S230) of generating partial patterns, based on the input palm pressure information, a step (S250) of comparing the plurality of generated partial patterns with reference partial patterns stored in the mobile device, and a step (S270) of determining whether the plurality of generated partial patterns and the reference partial patterns correspond to each other by a reference number or more, previously set in the mobile device. In addition, the method may further include a step (S290) of determining that a user authentication has succeeded, when the plurality of generated partial patterns and the reference partial patterns correspond to each other by the reference number or more, the reference number being previously set in the mobile device.

The method shown in FIG. 12 may be performed when the mobile device in the lock mode. A plurality of partial patterns are generated by steps S210 and S230. In step S250, the plurality of partial patterns generated by steps S210 and S230 are compared with reference partial patterns stored in the mobile device. The reference partial patterns are partial patterns that are generated by step S130 in the process described in FIG. 11 to be stored in the mobile device. That is, the reference partial patterns are partial patterns generated from the shape of a palm of a legal user.

In step S270, it is determined whether the partial patterns generated from the input shape of the user's palm correspond to the reference partial patterns stored in the mobile device by a reference number or more. The reference number has a value set by step S150 of FIG. 11. For example, when 23 partial patterns are generated in step S230, and the reference number is 15, in step S270, it is determined whether the number of partial patterns corresponding to the reference partial pattern among the 23 partial patterns is 15 or more. In this example, when the number of the corresponding partial patterns is less than 15, the user authentication fails, and the process for user authentication is to be restarted from the beginning. Therefore, the method proceeds to step S210. When the number of the corresponding partial patterns is 15 or more, it is determined that the user authentication has succeeded (S290). Thus, it is determined that the user inputting the palm pressure information in step S210 is a legal user, so that the user authentication succeeds. Accordingly, the lock mode of the mobile device is released.

Although the methods when one legal user uses the mobile device are illustrated in FIGS. 11 and 12, two or more legal user may use the mobile device. For example, when two users are legal users of the mobile device, steps S110 and S130 of FIG. 11 may be repeated twice by the different legal users. Also, in steps 250 and 270 of FIG. 12, the input partial patterns may be compared with each of two sets of different reference partial patterns. When the input partial patterns do not correspond to each of the two sets of different reference partial patterns by the reference number or more, the method proceeds to step S210 to again perform the process for user authentication from the beginning. When the input partial patterns correspond to any one of the two sets of different reference partial patterns by the reference number or more, in step S290, the lock mode may be released based on information of the authenticated user.

For example, when legal users A and B use the mobile device, the setting of UI/UX of A may be different from the setting of UI/UX of B, and applications and data accessible by A may be different from applications and data accessible by B. In step S290, it may be determined which UI/UX is to be applied in the release of the lock mode of the mobile device, based on whether the authenticated user is A or B. In addition, it may be determined which applications and data are to be accessible, based on whether the authenticated user is A or B.

FIG. 13 is a flowchart illustrating a third embodiment of the method for user authentication according to the present disclosure. In FIG. 13, there is illustrated a process of releasing a lock mode by inputting the shape of a palm of a user when the mobile device is in the lock mode. The method according to the embodiment of the present disclosure includes a step (S310) of inputting palm pressure information of a user, a step (S330) of generating a plurality of partial patterns, based on the input palm pressure information, a step (S350) of comparing the plurality of generated partial patterns with reference partial patterns stored in the mobile device, and a step (S370) of determining whether the plurality of generated partial patterns and the reference partial patterns correspond to each other by a reference number or more, previously set in the mobile device. In addition, the method may further include a step (S390) of determining that a user authentication has succeeded, when the plurality of generated partial patterns and the reference partial patterns correspond to each other by the reference number or more, the reference number being previously set in the mobile device.

Referring to FIG. 13, steps S310, S330, S350, S370, and S390 of FIG. 13 may be performed identically to steps S210, S230, S250, S270, and S290. However, according to the method shown in FIG. 13, when the plurality of generated partial patterns do not correspond to the reference partial patterns by the reference number or more as the determination result of step S370, unlike the method shown in FIG. 12, a number of authentication failure times is updated (S375). In addition, it is determined whether the number of authentication failure times exceeds a number of lock reference times (S385). When the number of authentication failure times does not exceed the number of lock reference times, the method proceeds to the initial step to again repeat the steps from the step S310. On the other hand, when the number of authentication failure times exceeds the number of lock reference times, the mobile device is locked (S395).

Steps S375, S385, and S395 are performed to lock the mobile device to a higher level than the lock mode of a typical mobile device by determining that an illegal user has attempted to perform a repetitive user authentication when user authentication failure is repeated by a previously number of times or more. When the number of lock reference times is set to 10, if the user authentication fails as the number of times of user authentication through the palm pressure information exceeds, the mobile device is locked without performing an additional user authentication process. When the mobile device is locked by step S395, the user authentication performed by steps S310, S330, S350, S370, and S390 is not performed any more, and a user authentication using another method is required. For example, the lock mode of the mobile device may be released by a registered e-mail or an additional authentication means, or may be released by initializing the mobile device.

Combinations of respective blocks in the block diagrams and respective operations in the flowchart may be performed by computer program instructions. These computer program instructions can be mounted on a processor of a general-purpose computer, a special purpose computer, or other programmable data processing equipment, and thus the instructions performed by the processor of the computer or other programmable data processing equipment generate a means for performing functions described in the respective blocks of the block diagrams or the respective operations of the flowchart. In order to implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagrams or the respective operations of the flowchart. Because the computer program instructions can be mounted on a computer or other programmable data processing equipment, a series of operation steps are performed in the computer or other programmable data processing equipment to create a process executed by the computer such that instructions performing the computer or other programmable data processing equipment may provide steps for executing functions described in block(s) of flowcharts.

Further, each block can indicate a part of a module, a segment, or a code including at least one executable instruction for executing specific logical function(s). It should be noticed that several execution examples can generate functions described in blocks out of an order. For example, two continuously shown blocks can be simultaneously performed, and the blocks can be performed in a converse order according to corresponding functions.

As used in this embodiment, the term "~ unit" refers to software or a hardware structural element such as FPGA or ASIC, and the "~ unit" perform some roles. However, the "~ unit" is not limited to software or hardware. The "~ unit" can be configured to be stored in an addressable storage medium and to play at least one processor. Accordingly, for example, the "~ unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "~ units" may be engaged by the smaller number of structural elements and "~ units," or may be divided by additional structural elements and "~ units." Furthermore, structural elements and "~ units" may be implemented to play a device or at least one CPU in a security multimedia card.

According to the present disclosure, it is possible to provide an apparatus for user authentication, which can simply perform a user authentication operation of a mobile device.

Also, according to the present disclosure, it is possible to provide a method for user authentication, which can simply perform a user authentication operation of a mobile device.

Also, according to the present disclosure, it is possible to provide a mobile device which can simply perform a user authentication operation.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An apparatus for user authentication, the apparatus comprising:
a pressure sensor array formed on a display panel of a mobile device; and
a sensing signal processor configured to receive information of a palm of a user and perform a user authentication through pattern analysis,
wherein the information of the palm of the user is received from the pressure sensor array,
wherein the display panel includes a light emitting element layer, and a first encapsulation layer formed on the light emitting element layer, and
wherein the pressure sensor array is formed on the first encapsulation layer.

2. The apparatus of claim 1, wherein the pressure sensor array is implemented as a capacitive touch sensor.

3. The apparatus of claim 1, wherein the pressure sensor array includes a plurality of unit sensors, and each unit pressure sensor of the plurality of unit pressure sensors includes at least one of a piezoelectric semiconductor, a piezoelectric carbon powder, a metal compound, a metal nano-particle, a silicone, a biometrics structure electrode, a CNT, a graphene, a metal nanowire, and an elective active polymer (EAP).

4. The apparatus of claim 1, wherein the pressure sensor array includes a plurality of unit pressure sensors, and each unit pressure sensor of the plurality of unit pressure sensors is disposed with adjacent unit pressure sensors to form a distance of 2 to 4 mm.

5. The apparatus of claim 1, wherein the pressure sensor array senses positions contacted with the palm and contact pressures at the positions.

6. The apparatus of claim 1, wherein the sensing signal processor:
generates an image of the palm based on the information of the palm of the user received from the pressure sensor array;
generates at least one partial pattern by analyzing the image of the palm; and performs an authentication operation of the user by comparing the generated at least one partial pattern with at least one reference partial pattern previously stored in the apparatus.

7. The apparatus of claim 1, wherein the display panel is formed on a first surface of the mobile device,
wherein the pressure sensor array is formed on a second surface opposite to the first surface of the mobile device.

8. The apparatus of claim 1, wherein the pressure sensor array includes a Wheatstone bridge circuit or a voltage dividing circuit.

* * * * *